United States Patent Office 3,572,098
Patented Mar. 23, 1971

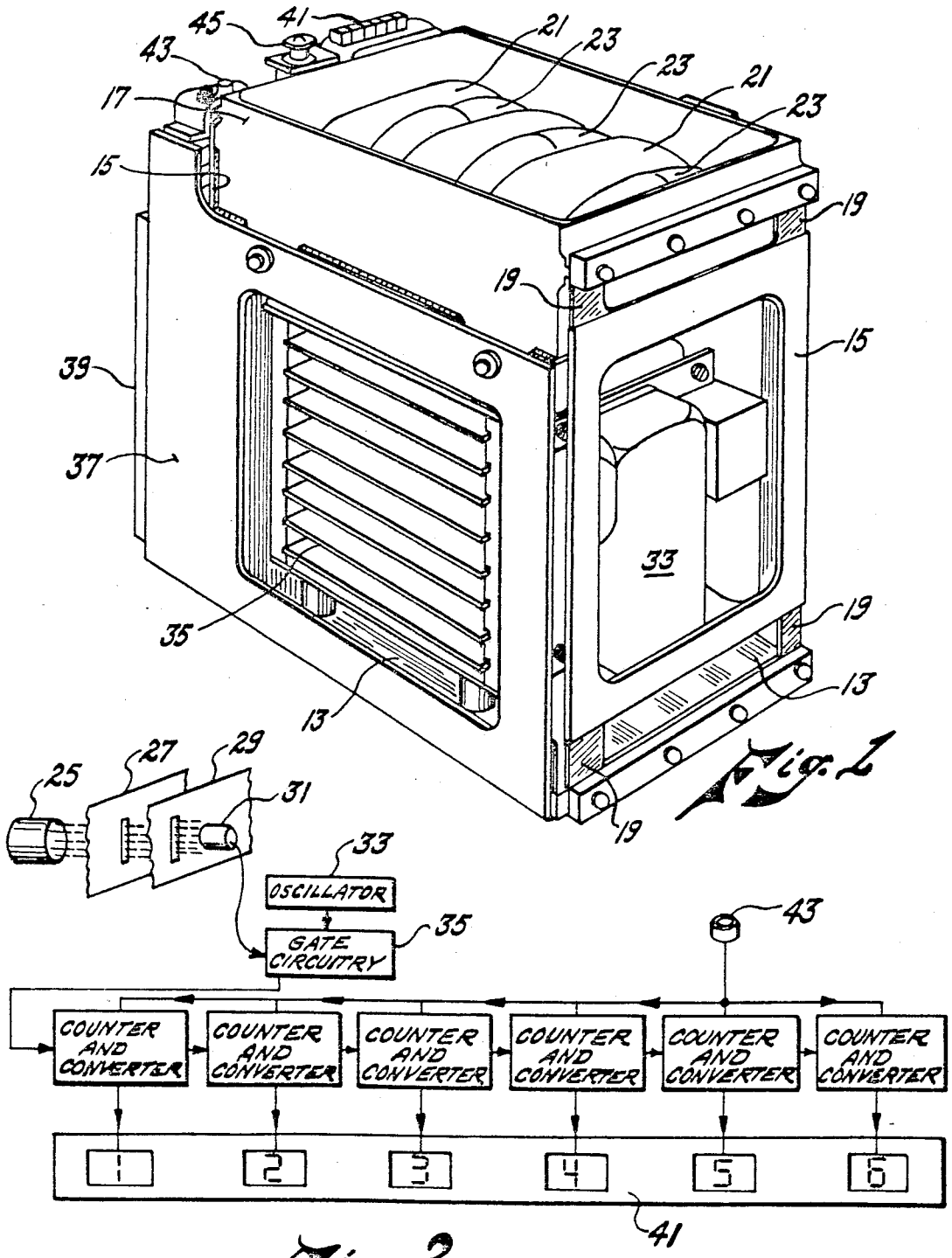
March 23, 1971  J. W. FOGWELL  3,572,098
MASS MEASURING INSTRUMENT SPRING SYSTEM
Filed Nov. 26, 1968
INVENTOR.
JOSEPH W. FOGWELL
BY Harry A. Herbert Jr.
Arsen Tashjian
ATTORNEYS

3,572,098
MASS MEASURING INSTRUMENT SPRING SYSTEM
Joseph W. Fogwell, San Antonio, Tex., assignor to the United States of America as represented by the Secretary of the Air Force
Filed Nov. 26, 1968, Ser. No. 779,116
Int. Cl. G01g 3/16
U.S. Cl. 73—67.2                                5 Claims

ABSTRACT OF THE DISCLOSURE

A spring system to provide a force for oscillating a mass at precise and repeatable frequencies including a pair of spaced parallel plate springs each having the lower end thereof attached to a fixed base plate. The upper and lower ends of each spring includes plate fulcra and the upper end is attached to and supports a weighing pan in which the mass is positioned. The pan is offset from neutral causing the plate fulcra to be deformed and, when released, the restoring force produces oscillation at a fixed frequency. Since the spring constant is known and the mass is constrained to substantially linear motion, the oscillation frequency will be an indication of the mass in the weighing pan.

BACKGROUND OF THE INVENTION

This invention relates to a system for measuring mass independently of gravitational forces and, more particularly, the invention is concerned with providing a precise mass measuring instrument for supporting and repeatably oscillating the mass in a substantially linear motion and measuring the period of oscillation.

One of the problems encountered by man as he extends his ability to stay in outer space is the determination of the weight of objects under zero gravity conditions. Virtually all of the mass measurements made on earth are comparisons of forces produced by standard and unknown masses attracted by the earth's ubiquitous gravitational field. In the absence of or compensation of this field, such as occurs in orbital or space flight, some other means must be used to obtain the mass of unknown objects.

In patent application Serial Number 730,461, filed May 20, 1968, there is described a spring/mass pendulum wherein an air bearing is utilized to constrain the motion of the mass to a single translatory axis and to support the mass under conditions of gravity. The air bearing described therein requires a supply of gas, a regulator and a rather precise mechanism, the air bearing itself. Some sort of simpler arrangement to support and constrain the mass to linear motion has been sought without success.

SUMMARY OF THE INVENTION

The present invention is primarily concerned with the provision of a system for accurately determining the mass and corresponding earth weight of various objects in space. In the practice of the invention the object whose mass is to be determined is fixedly attached to a weighing pan by means of straps or other suitable means. The weighing pan is supported in such a manner as to allow linear motion in only one axis. Elastic restoring forces are applied to the mass and weighing pan so that when displaced and released, simple, virtually undamped harmonic motion ensues. A device to detect and record the period of oscillation is included and the unknown mass is determined from a simple mathematical relationship to the period of oscillation.

Accordingly, it is an object of the invention to provide a system for precisely determining the mass or change in mass of an object under conditions of weightlessness encountered in outer space.

Another object of the invention is to provide a system for determining the mass of an object by causing the mass to oscillate at a precise and repeatable frequency while supporting the mass and thereby determining the period of oscillation.

Still another object of the invention is to provide a spring system including means for supporting and guiding an oscillating mass in substantially linear motion so that the period of oscillation can be detected and recorded.

A further object of the invention is to provide a spring system for determining the mass of an object in zero gravity and partial gravity field by measuring the period of oscillation of the mass after it is caused to oscillate.

Another further object of the invention is to provide an instrument spring system that is simple, compact, and reliable and particularly suited for use in a self-contained mass measuring apparatus.

These and other objects, features, and advantages will become more apparent after considering the description that follows and from the drawings wherein like reference numerals are used throughout to identify like elements.

DESCRIPTION OF THE DRAWINGS

In the drawings:
FIG. 1 is a view in isometric of a spring system including plate fulcra or flexure pivots according to the invention as used in an instrument for measuring mass; and
FIG. 2 is a simplified block diagram of the circuitry involved in detecting and recording the period of oscillation.

DESCRIPTION OF A PREFERRED EMBODIMENT

Although the hereinafter described spring system can be used for other purposes, its most useful application is in zero gravity and partial gravity fields as a mass measuring instrument. Weighing scales used in earth environment depend on gravity and will not operate satisfactorily in other than a gravity field.

Referring now to FIG. 1, there is shown a spring system according to the invention including a base plate 13 to which are attached two parallel upwardly extending plate springs 15 at right angles thereto. A top member in the form of a weighing pan 17 connects the upward ends of the plate springs 15 to each other so that there is formed, in effect, a parallelogram geometric relationship among the elements. Two grooves are machined near the top and bottom of the springs 15 to form thinned sections 19 which are flexible and act as plate fulcra or flexure pivots. By the choice of proper spring material, the plate springs 15 will have sufficient elasticity to provide a restoring force toward the neutral or undisplaced position. If the dimensions of the resulting structure are chosen such that the length of the plate springs 15 is relatively long in comparison to the amplitude of motion, the motion of the weighing pan 17 will, to the first order, be simple translation, that is, back and forth movement in a single axis. Obviously, a small amount of curvilinear motion is present, but this is negligible for purposes of the invention.

The mass 21 to be measured is fixedly attached to the weighing pan 17 by means of the straps 23. Since the pan 17 is supported by the springs 15, offsetting the pan 15 from neutral deforms the springs 15 and causes the pan to oscillate. During oscillation, the weighing pan 17 is constrained to a nearly linear motion because of the parallelogram geometry of the pan 17, base 13 and two springs 15.

The restoring force applied by the springs 15 causes the pan 17 and mass 21 to oscillate. The period of oscillation is detected and recorded by an electro-optical system shown schematically in FIG. 2. A light source 25 is fixedly attached to a non-oscillating part of the device and passes through a slit 27 in optical alignment therewith. A second slit 29 is attached to the oscillating weighing pan 17 such that the two slits are in alignment each time the pan 17 oscillates and passes through the zero position. A photocell 31 is positioned to receive the light which passes through the slits 27 and 29 when they are in alignment with each other and the signal from the photocell 31 is passed to an electronic counting circuit. An oscillator 33 is used in the electronic circuitry, which includes logic modules 35 held in the side panel 37 and battery pack 39, to detect the period of oscillation of the weighing pan 17. A digital readout arrangement 41 provided with a manual reset button 43 is included to record and display the actual period of oscillation of the unknown mass 21 held in the weighing pan 17 by the straps 23. A sear button 45 releases the weighing pan 17 from a predetermined displacement so that the oscillating frequency can begin.

MODE OF OPERATION OF THE INVENTION

In operation, the mass 21 to be weighed is placed in the weighing pan 17 and tied down by the straps 23. The pan 17 is then offset from the equilibrium position and held by the sear button 43. When the sear button 43 is released the mass 21 in the pan 17 begins to oscillate because of the restoring forces applied by the springs 15. The oscillation frequency is determined electronically by using a light source 25 in conjunction with two slits 27 and 29 and a photo-electric cell 31. This combination of elements produces an electrical impulse each time the weighing pan passes the zero or equilibrium position. By counting the number of oscillations in a given time, the mass is determined from a simple mathematical relationship to the period of oscillation. During oscillation, the weighing pan 17 is constained to nearly linear motion because of the parallelogram geometry of the pan 17, base 13 and springs 15.

The springs 15, as described, support and guide the weighing pan 17 thereby eliminating the necessity of having a sliding bearing which would introduce friction and result in a less efficient system. Also, a sliding bearing would require close tolerance machining, periodic lubrication and would be subject to galling and self-welding in reduced-pressure environments. If an air bearing were utilized, a continuous and well-regulated air supply would be required. Thus, the plate fulcra or flexure pivot arrangement described is simpler and more dependable than any of the heretofore known systems for supporting and constraining a mass for purposes of mass measurement by determining the period of oscillation of the mass.

Although the invention has been illustrated in the accompanying drawing and described in the foregoing specification in terms of a preferred embodiment thereof, the invention is not limited to this embodiment or to the particular uses mentioned. It will be apparent to those skilled in the art that my invention can be practiced utilizing the disclosed mass measurement system for determining the change in mass under both laboratory and space conditions. In addition to the measurement of small objects, the disclosed system can provide mass measurement of packages over a range of a few milligrams to thousands of kilograms. This would include the mass measurement of crew members in spacecraft under zero gravity conditions. Also, it should be understood that various changes, alterations, modifications and substitutions particularly with respect to the construction details, can be made in the arrangement of the several elements without departing from the true spirit and scope of the appended claims.

Having thus described by invention, what I desire to secure by Letters Patent of the United States is:

1. An instrument spring system for supporting and guiding a mass along a single translatory axis during oscillation thereof, said system comprising a horizontal base plate, a pair of upstanding plate spring members in spaced parallel relationship to each other, the lower ends of said spring members being fixedly attached to said base plate, a weighing pan spaced above and parallel to said base plate for containing the mass, the upper ends of said spring members being fixedly attached to said weighing pan, means for laterally oscillating said weighing pan and mass in a substantially linear motion at precise and repeatable frequencies, and means for determining the period of oscillation of the mass contained in said weighing pan by counting the number of oscillations of the mass in a given time period thereby determining the weight thereof independently of gravitational forces.

2. The instrument spring system defined in claim 1 wherein each of said upstanding plate spring members includes plate fulcra positioned near the upper and lower ends thereof, said plate fulcra being thinned sections which flex during oscillation of the mass.

3. The instrument spring system defined in claim 2 wherein the means for oscillating said weighing pan and mass includes a sear button for holding said mass in an offset position, the release of said sear button causing said mass to begin to oscillate because of the restoring forces applied by said plate spring members.

4. The instrument spring system defined in claim 2 wherein the means for determining the period of oscillation of the mass contained in the weighing pan includes a light source fixedly attached to a non-oscillating part of the instrument in alignment with a first slit, a second slit attached to an oscillating part of the instrument, said first and second slits being in alignment for passage of light therethrough each time the oscilating mass passes through the zero position, and a photocell in alignment with said light source such that the mutual alignment of said slits allows the light to impinge on said photocell thereby causing a signal to be produced.

5. The instrument spring system defined in claim 4 wherein the means for determining the period of oscillation of the mass contained in the weighing pan further includes a digital readout system comprising an electronic counting circuit for receiving a signal from said photocell for each oscillation of the mass, and a timer for indicating the elapsed time, thereby determining the period of oscillation to which the mass is mathematically related.

References Cited

UNITED STATES PATENTS

| | | | |
|---|---|---|---|
| 2,305,783 | 12/1942 | Heymann | 73—67 |
| 2,349,736 | 5/1944 | Knobel | 73—67.2X |
| 2,455,532 | 12/1948 | Sunstein | 73—71.3X |
| 2,535,326 | 12/1950 | Smith | 73—71.3X |
| 2,784,588 | 12/1957 | Humble | 73—67.2X |
| 2,928,668 | 3/1960 | Blasingame | 73—71.2X |
| 3,354,698 | 11/1967 | Christmann | 73—67.2 |
| 3,492,858 | 2/1970 | Heflinger | 73—67.2 |

RICHARD C. QUEISSER, Primary Examiner

C. E. SNEE III, Assistant Examiner

U.S. Cl. X.R.

177—210